US009189286B2

(12) United States Patent
Lambert et al.

(10) Patent No.: US 9,189,286 B2
(45) Date of Patent: Nov. 17, 2015

(54) SYSTEM AND METHOD FOR ACCESSING STORAGE RESOURCES

(75) Inventors: Timothy M. Lambert, Austin, TX (US); Quy N. Hoang, Round Rock, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 541 days.

(21) Appl. No.: 12/687,475

(22) Filed: Jan. 14, 2010

(65) Prior Publication Data
US 2011/0173326 A1    Jul. 14, 2011

(51) Int. Cl.
G06F 15/173    (2006.01)
G06F 9/50    (2006.01)
H04L 12/24    (2006.01)

(52) U.S. Cl.
CPC .......... G06F 9/5061 (2013.01); H04L 41/0803 (2013.01)

(58) Field of Classification Search
USPC ................................................. 709/223, 226
See application file for complete search history.

(56) References Cited

U.S. PATENT DOCUMENTS

| | | | | |
|---|---|---|---|---|
| 2002/0042910 | A1* | 4/2002 | Baumeister et al. | 717/172 |
| 2002/0138706 | A1* | 9/2002 | Hugly | 711/163 |
| 2003/0208581 | A1* | 11/2003 | Behren et al. | 709/223 |
| 2004/0181589 | A1* | 9/2004 | Suleiman | 709/213 |
| 2005/0144195 | A1* | 6/2005 | Hesselink et al. | 707/201 |
| 2006/0085824 | A1* | 4/2006 | Bruck et al. | 725/86 |
| 2007/0067565 | A1* | 3/2007 | Taninaka et al. | 711/114 |
| 2007/0083657 | A1* | 4/2007 | Blumenau et al. | 709/226 |
| 2007/0214268 | A1* | 9/2007 | Laurent et al. | 709/226 |
| 2008/0201458 | A1* | 8/2008 | Salli | 709/223 |
| 2008/0215813 | A1* | 9/2008 | Igarashi et al. | 711/114 |
| 2009/0031013 | A1* | 1/2009 | Kunchipudi et al. | 709/222 |
| 2010/0174810 | A1* | 7/2010 | Cain et al. | 709/222 |
| 2011/0078293 | A1* | 3/2011 | Phung et al. | 709/222 |
| 2011/0093594 | A1* | 4/2011 | Raymond | 709/225 |
| 2011/0099187 | A1* | 4/2011 | Hansen | 707/769 |
| 2011/0185370 | A1* | 7/2011 | Tamir et al. | 719/324 |

OTHER PUBLICATIONS

Lambert et al.; "System and Method for Providing Accessibility for Access Controller Storage Media"; U.S. Appl. No. 12/465,348, Filed on May 13, 2009; pp. 38.

* cited by examiner

Primary Examiner — Jason Recek
(74) Attorney, Agent, or Firm — Baker Botts L.L.P.

(57) ABSTRACT

Systems and methods for accessing configurable storage resources are provided. In some embodiments, an access controller for use in an information handling system is provided. The access controller may include a processor, a plurality of configurable storage resources coupled to the processor, and a network interface communicatively coupled to the processor and configured to allow simultaneous in-band and out-of-band access to the plurality of configurable storage resources. The processor may be configured to determine a configuration of the plurality of configurable storage resources, map the configuration to the plurality of configurable storage resources, and execute an application for managing the simultaneous access of the plurality of configurable storage resources.

20 Claims, 1 Drawing Sheet

SYSTEM AND METHOD FOR ACCESSING STORAGE RESOURCES

TECHNICAL FIELD

The present disclosure relates in general to information handling systems, and more particularly to providing systems and methods for accessing storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, an information handling system may include an access controller that provides an interface between the information software and the platform hardware in the system. The controller, such as a baseboard management controller (BMC), a chassis management controller (CMC), or a remote access controller (RAC), may manage and/or collect data from various components associated with the information handling system and may alert a user of any irregularities in those components. Additionally, the controllers may access storage components associated with the information handling system to perform various actions such as booting from the storage volumes, updating firmware, and other tasks.

Typically, there are two types of storage components associated with an access controller in an information handling system: unmanaged persistent storage and managed persistent storage. The unmanaged persistent storage, generally flash media (e.g., SD cards or soldered down eMMC), is typically used as server hypervisors and/or serves as a repository for data such as system diagnostics, drivers, etc. The unmanaged persistent storage is traditionally exclusively accessible by a host server. Managed persistent storage is typically a remotely-accessible flash media component (e.g., SD cards or soldered down eMMC) that can be controlled by a management subsystem of the information handling system. Since the two storage components can only be accessed a single domain, either by the host or remotely, providing redundancy and/or user flexibility is not available.

SUMMARY

In accordance with the teachings of the present disclosure, the disadvantages and problems associated with two mutually exclusive storage components in an information handling system have been reduced or eliminated.

In some embodiments, an access controller for use in an information handling system is provided. The access controller includes a processor, a plurality of configurable storage resources coupled to the processor, and a network interface communicatively coupled to the processor and configured to allow simultaneous in-band and out-of-band access to the plurality of configurable storage resources. The processor may be configured to determine a configuration of the plurality of configurable storage resources, map the configuration to the plurality of configurable storage resources, and execute an application for managing the simultaneous access of the plurality of configurable storage resources.

In other embodiments, an information including a processor, a memory communicatively coupled to the processor, and an access controller communicatively coupled to the processor is provided. The access controller may be configured to determine a configuration of a plurality of configurable storage resources, map the configuration to the plurality of configurable storage resources, and execute an application for managing the simultaneous access of the plurality of configurable storage resources.

In some embodiments, a method for accessing a plurality of configurable storage resources is provided. The method may include steps for determining a configuration of the plurality of configurable storage resources, mapping the configuration to the plurality of configurable storage resources, and executing an application for managing a simultaneous in-band and out-of-band access of the plurality of configurable storage resources.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
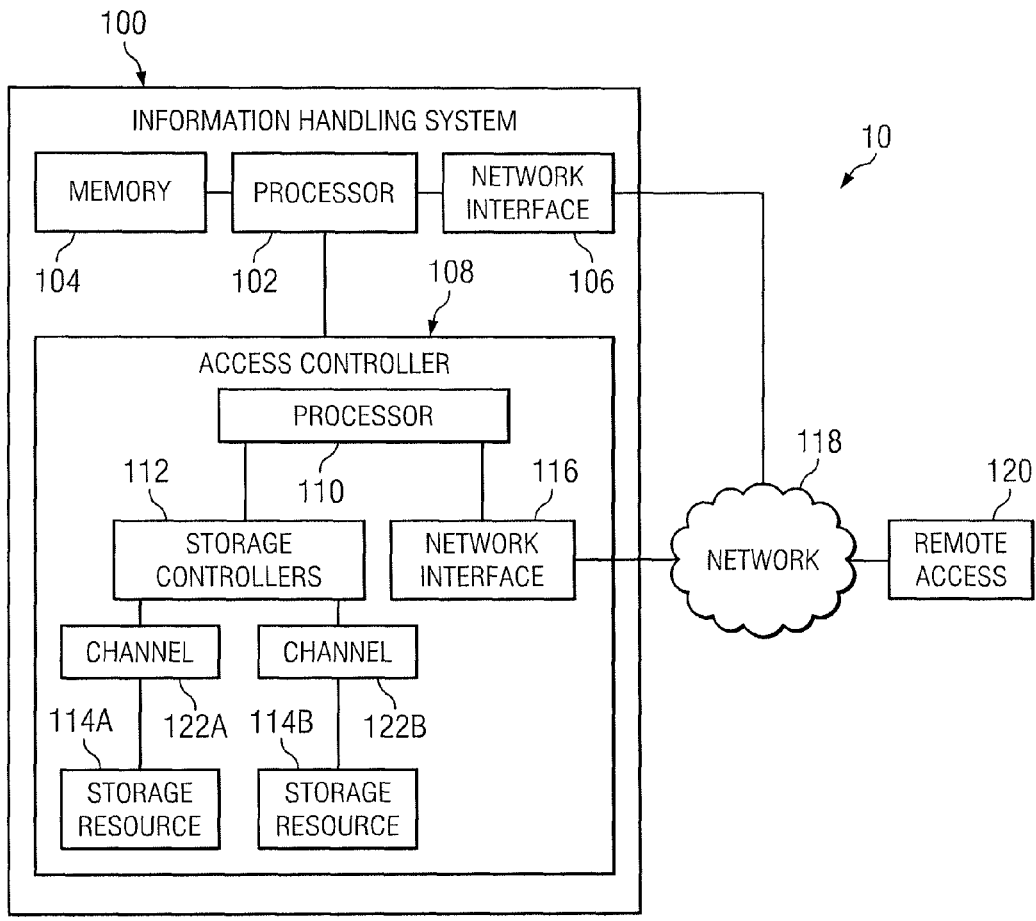
FIG. 1 illustrates a block diagram of an example system for providing access to multiple storage resources, in accordance with certain embodiments of the present disclosure.
Figure 2:
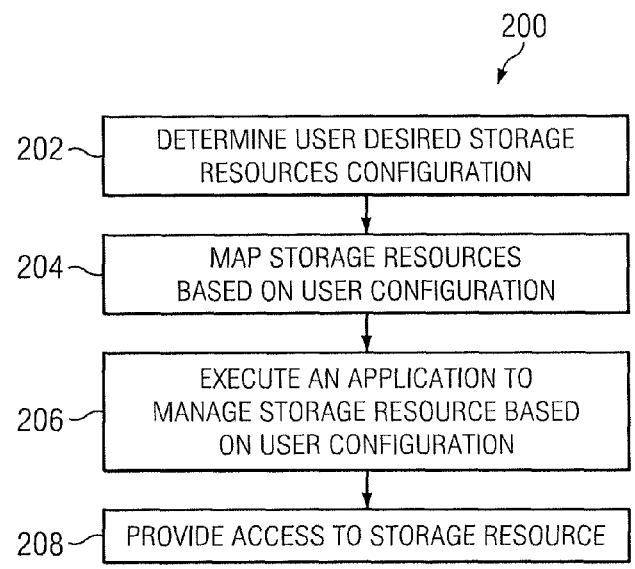
FIG. 2 illustrates an example method for accessing storage resources, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

FIG. 1 illustrates a block diagram of an example system 10 for providing access to multiple storage resources, in accordance with certain embodiments of the present disclosure. As depicted in FIG. 1, system 10 may include an information handling system 100, a network 118, and a remote client 120.

Information handling system 100 may generally be operable to receive data from and/or communicate data to one or more other information handling systems via network 118. In certain embodiments, information handling system 100 may be a server. In other embodiments, information handling system 100 may be a personal computer (e.g., a desktop computer or a portable computer). As depicted in FIG. 1, information handling system 100 may include a processor 102, a memory 104 communicatively coupled to processor 102, a network interface 106 communicatively coupled to processor 102, and an access controller 108 coupled to processor 102.

Processor 102 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100.

Memory 104 may be communicatively coupled to processor 102 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

Network interface 106 may include any suitable system, apparatus, or device operable to serve as an interface between information handling system 100 and network 118. Network interface 106 may enable information handling system 100 to communicate over network 118 using any suitable transmission protocol and/or standard, including without limitation all transmission protocols and/or standards enumerated below with respect to the discussion of network 118.

Access controller 108 may be coupled to processor 102 via, for example, a universal serial bus (USB) interface, a network controller sideband interface (NC-SI), a peripheral component interconnect (PCI) interface, a PCI-express interface, an Ethernet interface, or any other suitable interfaces, and may be any system, device, or apparatus configured to permit an administrator or other person to remotely monitor and/or remotely manage information handling system 100 (e.g., via an information handling system remotely connected to information handling system 100 via network 118) regardless of whether information handling system 100 is powered on and/or has an operating system installed thereon. Access controller 108 may also provide direct access to storage resources 114 via one or more channels, such as channels 122. In certain embodiments, access controller 108 may include or may be, baseboard management controller (BMC), a chassis management controller (CMC), an integral part of a Dell Remote Access Controller (DRAC), or an Integrated Dell Remote Access Controller (iDRAC).

As depicted in FIG. 1, access controller 108 may include a processor 110, a storage controller 112, storage resources 114, a channel 122 coupled to each storage resource 114 and storage controller 112, and a network interface 116 communicatively coupled to processor 110.

Processor 110 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 110 may interpret and/or execute program instructions and/or process data stored in storage resources 114 and/or another component of information handling system 100.

Storage controller 112 may be communicatively coupled to processor 110 and may include any system, apparatus, or device operable to manage the communication of data between storage resources 114 and processor 110. In certain embodiments, storage controller 112 may provide functionality including, without limitation, input/output routing, and error detection and recovery. Storage controller 112 may be implemented using hardware, software, or any combination thereof.

Storage resources 114 may generally include any system, device, or apparatus configured to retain program instructions and/or data for a period of time (e.g., computer-readable media). Storage resources 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power is turned off or power to access controller 108 is removed.

In some embodiments, storage resources 114 may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

In certain embodiments, storage resource 114A may include various combinations of unmanaged persistent storage (e.g., storage configured to store, for example, hypervisors, keys such as software license keys, system diagnostics, drivers, system configurations, etc.) and managed persistent storage. For example, a user may configure storage resources 114 based on a user desired implementation, such as, for example, uniform redundancy across storage resources 114, flexible accessibility of storage devices for both in-band and out-of-band, etc. Table 1 illustrates example user configurations for storage resources 114.

TABLE 1

Example storage resource configurations

| Storage Resource 114A | Storage Resource 114B |
|---|---|
| unmanaged persistent storage | managed persistent storage |
| managed persistent storage | unmanaged persistent storage |
| aggregate non-redundant unmanaged storage | |
| aggregate non-redundant managed storage | |
| redundant unmanaged storage (e.g., storage resource 114A mirrors storage resource 114B) | |
| redundant managed storage (e.g., storage resource 114B mirrors storage resource 114A) | |

In some embodiments, storage resources 114 may be integral to access controller 108, such that storage resources 114 are "fixed" or "permanent" component of access controller 108 (e.g., such that removal of storage resources 114 would cause inoperability of access controller 108). In other embodiments, storage resources 114 may be a removable component of access controller 108. Storage resources 114 may be installed in access controller 112 by a manufacturer, end user, and/or any other suitable mechanism. In certain embodiments, storage resource 114A may be integral to access controller 108 and storage resource 114B may be a removable component.

In certain embodiments, storage resources 114 may include a computer-readable medium (e.g., a flash card, universal serial bus drive, etc.) that may be added and/or interfaced with access controller 108 via an external hardware port. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Storage resources 114 may include any collection of data and/or instructions suitable to facilitate operation of information handling system 100, including, without limitation, one or more operating systems (e.g., hypervisor, Windows-based operating system, Linux-based operating system, etc.), configuration data associated with the information handling system 100, operating systems configured to execute on information handling system 100, and/or application programs configured to execute on information handling system 100. In certain embodiments, storage resources 114 may include bootable media, such that information handling system 100 may boot using instructions stored on storage resources 114 (e.g., such boot instructions may be communicated to processor 102 via any communication protocol). Similarly, storage resources 114 may include bootable media accessible by a remote user via, for example, remote client 120.

Network interface 116 may include any suitable system, apparatus, or device operable to serve as an interface between access controller 108 and network 118. Network interface 116 may enable access controller 108 to communicate over network 118 using any suitable transmission protocol and/or standard, including without limitation all transmission protocols and/or standards enumerated below with respect to the discussion of network 118.

In some embodiments, network interface 116 may be a local area network on motherboard (LOM) and may be configured to allow simultaneous in-band and out-of-band communication with access controller 108, and in particular, storage resources 114 through any suitable network interface. For example, the LOM may allow processor 102 of information handling system 100 to access controller 108 utilizing the same or similar drivers that connect remote client 120 to access controller 108. In some embodiments, the LOM may connect processor 102 to access controller 108 via a separate virtual local area network (LAN). The LOM may remove the need for a separate management host application for in-band access.

Network 118 may be a network and/or fabric configured to communicatively couple information handling system 100, access controller 108, remote client 120, other information handling systems, and/or other networked components to each other. Network 118 may include a communication infrastructure, which provides physical connections, and a management layer, which organizes the physical connections, information handling system 100, access controller 108, and remote client 120. In the same or alternative embodiments, network 118 may allow block I/O services and/or file access services to network-attached computer-readable media.

Network 118 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 118 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), any other transport that operates with the SCSI protocol, advanced technology attachment (ATA), serial ATA (SATA), advanced technology attachment packet interface (ATAPI), serial storage architecture (SSA), integrated drive electronics (IDE), network controller sideband interface (NC-SI), and/or any combination thereof. Network 118 and its various components may be implemented using hardware, software, or any combination thereof.

Remote client 120 may be any device configured to provide out-of-band access to information handling system 100, and in particular, to storage resources 114. Remote client may be another information handling system, another access controller, or any other system that can connect to network 118 and can access components of information handling system 100.

Channels 122 may be any interconnects that provide access to storage resources 114. In some embodiments, a channel 122 may be dedicated to a storage resource 114 (e.g., channel 122A may be a dedicated channel to storage resource 114A). The implementation of a dedicated channel increases performance of system 10 by allowing simultaneous access to storage resources 114.

In operation, access controller 108, and in particular, processor 110, may allow concurrent (e.g., simultaneous access from in-band and out-of-band users) or selective access between components of information handling system 100 and remote client 120 to storage resources 114 depending on the configuration of storage resources 114, e.g., example configurations shown in Table 1. In some embodiments, access controller 108, and in particular processor 110, may run several operating systems allowing access to storage resources 114 in the event of, for example, a first operating system managing processor 102 or users accessing storage resources 114 via remote access 120 is offline or is being updated. For example, access controller 108 may run a primary access controller operating system and a secondary controller operating system. The primary access controller operating system may access storage resources 114 and may be updated and/or rebooted without interrupting access to storage resources 114 by other components of information handling system 100 and/or remote client 120.

The secondary operating system may be configured to manage storage resources 114. In some embodiments, the secondary operating system may manage storage resources 114 as separate storage resources, aggregate storage resources, and/or mirrored storage resources based at least on a user desired configuration. For example, if the user desires that storage resource 114A and storage resource 114B be aggregated non-redundant managed storage, access controller 108 may map storage resources 114 accordingly, and allow both in-band and out-of-band access. In some embodiments, access controller 108 may allow simultaneous in-band and out-of-band access.

The secondary operating system may also be configured to selectively or concurrently allow access to storage resources 114. For example if the primary access controller operating system is currently accessing storage resources 114, access controller may run one or more server applications to allow concurrent access to storage resources 114. In some embodiments, access controller 109 may execute a preboot execution environment (PXE) server application configured to respond to any local or network based boot commands received via network 118 by allowing access to storage resources 114 storing the boot image.

The secondary operating system may also run a network attached storage (NAS) server application configured to allow access to storage resources 114. In some embodiments, the NAS server application may allow the primary access controller operating system access to storage resources 114, e.g., managed persistent storage, virtual FLASH, etc. In other embodiments, the NAS server application may allow access to local components of information handling system 100 including, for example, processor 102. Processor 102 may access BIOS, PXE boot image, operating system boot, a hypervisor, and any secondary operating systems stored on storage resources 114. As another example, the NAS server application may allow access to remote users via remote client 120. The remote users may update various images stored on storage resources 114. Additionally, the NAS server application may allow access to storage resources 114 by other access controllers for scaling storage capabilities.

FIG. 2 illustrates an example method 200 for accessing storage resources 114, in accordance with certain embodiments of the present disclosure. At step 202, access controller 108 may determine the configuration of storage resources 114 as desired by a user. In some embodiments, the user may divide physical storage elements between storage resources 114A (e.g., unmanaged persistent storage) and storage resources 114B (e.g., managed persistent storage). In other embodiments, the user may aggregate the physical storage elements, and or mirror the physical storage elements. Access controller 108 may determine the desired configuration and at step 204, map the storage resources for access.

At step 206, access controller 108 may execute an application for managing the user-defined storage resource configuration. In some embodiments, access controller 108 may execute a PXE server application configured for local or in-band access to storage resources 114. For example, the PXE server application may be configured to boot using a boot media stored on storage resources 114.

In other embodiments, access controller 108 may execute a NAS server application configured for allowing access to storage resources 114 to various components. For example, NAS server application may enable access to storage resources 114 for a primary access controller operating system, a host server, remote users via remote clients 120, and/or other systems or access controllers coupled to system 10.

At step 208, access controller 108 may provide access to storage resources 114. In some embodiments, a request may be received by access controller 108 via network interface 116, which may be configured to receive both in-band and out-of-band communication received over network 118. Network interface 116 may be a LOM that allows components of information handling system 100, e.g., processor 102, to connect with access controller 108 using the same or similar drivers as out-of-band connections. Access controller 108 may provide the access to storage resource 114 via dedicated channels 122 directly coupled to storage resource 114.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Using the methods and systems disclosed herein, problems associated with conventional approaches to accessing storage resource may be improved, reduced, or eliminated. For example, the methods and systems disclosed herein allow for customizable storage resource configurations, in particular, configurations of both unmanaged and managed persistent storage resources. Additionally, the methods and systems of the present disclosure provide for direct access to the storage resources for both in-band and out-of-band components.

Although the present disclosure has been described in detail, it should be understood that various changes, substitutions, and alterations can be made hereto without departing from the spirit and the scope of the disclosure as defined by the appended claims.

What is claimed is:

1. An access controller for use in an information handling system, comprising:
   a processor;
   a plurality of configurable persistent storage resources communicatively coupled to the processor, where at least one of the plurality of configurable persistent storage resources is permanently installed in an access controller and at least one other of the plurality of configurable persistent storage resources is removable from the access controller;
   a network interface communicatively coupled to the processor and configured to allow simultaneous in-band and out-of-band access to the plurality of configurable persistent storage resources; and
   wherein the processor is configured to:
      determine a configuration of the plurality of configurable persistent storage resources;
      map the configuration to the plurality of configurable persistent storage resources; and
      execute an application for providing the simultaneous in-band and out-of-band access of the plurality of configurable persistent storage resources, the application further providing uninterrupted in-band and out-of-band access.

2. An access controller according to claim 1, wherein the plurality of configurable persistent storage resources comprise at least one of an unmanaged persistent storage resource and a managed persistent storage resource.

3. An access controller according to claim 1, wherein the network interface comprises a local area network on motherboard (LOM) interface.

4. An access controller according to claim 1, wherein the application comprises a preboot execution environment (PXE) server application configured to respond to in-band or out-of-band network based boot commands stored on the plurality of configurable persistent storage resources.

5. An access controller according to claim 1, wherein the application comprises a network attached storage (NAS) server application configured to allow access to the plurality of configurable persistent storage resources.

6. An access controller according to claim 1, wherein the access controller further comprises a dedicated channel for each of the plurality of configurable persistent storage resources.

7. An access controller according to claim 1, wherein the plurality of configurable persistent storage resources comprises separate storage resources, aggregate storage resources, or mirrored storage resources.

8. An information handling system, comprising:
a processor;
a memory communicatively coupled to the processor; and
an access controller communicatively coupled to the processor, the access controller configured to:
determine a configuration of a plurality of configurable persistent storage resources, where at least one of the plurality of configurable persistent storage resources is permanently installed in an access controller and at least one other of the plurality of configurable persistent storage resources is removable from the access controller;
map the configuration to the plurality of configurable persistent storage resources; and
execute an application for providing a simultaneous in-band and out-of-band access of the plurality of configurable persistent storage resources, the application further providing uninterrupted in-band and out-of-band access.

9. An information handling system according to claim 8, wherein the access controller is a baseboard management controller, a chassis management controller, or a remote access controller.

10. An information handling system according to claim 8, wherein the plurality of configurable persistent storage resources comprise at least one of an unmanaged persistent storage resource and a managed persistent storage resource.

11. An information handling system according to claim 8, wherein the access controller comprises a local area network on motherboard (LOM) network interface.

12. An information handling system according to claim 8, wherein the application comprises a preboot execution environment (PXE) server application configured to respond to in-band or out-of-band network based boot commands stored on the plurality of configurable persistent storage resources.

13. An information handling system according to claim 8, wherein the application comprises a network attached storage (NAS) server application configured to allow access to the plurality of configurable persistent storage resources.

14. An information handling system according to claim 8, wherein the access controller further comprises a dedicated channel for each of the plurality of configurable persistent storage resources.

15. An information handling system according to claim 8, wherein the plurality of configurable persistent storage resources comprises separate storage resources, aggregate storage resources, or mirrored storage resources.

16. A method for accessing a plurality of configurable persistent storage resources, comprising:
determining a configuration of the plurality of configurable persistent storage resources, where at least one of the plurality of configurable persistent storage resources is permanently installed in an access controller and at least one other of the plurality of configurable persistent storage resources is removable from the access controller;
mapping the configuration to the plurality of configurable persistent storage resources; and
executing an application for providing a simultaneous in-band and out-of-band access of the plurality of configurable persistent storage resources by the access controller, the application further providing uninterrupted in-band and out-of-band access.

17. A method according to claim 16, wherein the plurality of configurable persistent storage resources comprise at least one of an unmanaged persistent storage resource and a managed persistent storage resource.

18. A method according to claim 16, wherein the application comprises a preboot execution environment (PXE) server application configured to respond to in-band or out-of-band network based boot commands stored on the plurality of configurable persistent storage resources.

19. A method according to claim 16, wherein the application comprises a network attached storage (NAS) server application configured to allow access to the plurality of configurable persistent storage resources.

20. A method according to claim 16, wherein the storage resources plurality of configurable persistent storage resources comprises separate storage resources, aggregate storage resources, or mirrored storage resources.

* * * * *